(12) United States Patent
Hamada et al.

(10) Patent No.: US 6,827,170 B2
(45) Date of Patent: Dec. 7, 2004

(54) HOOD AIRBAG ASSEMBLY

(75) Inventors: Makoto Hamada, Toyota (JP); Hiroyuki Takahashi, Aichi-ken (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 0 days.

(21) Appl. No.: 10/262,070

(22) Filed: Oct. 2, 2002

(65) Prior Publication Data

US 2003/0062208 A1 Apr. 3, 2003

(30) Foreign Application Priority Data

Oct. 2, 2001 (JP) ..................... P2001-306012

(51) Int. Cl.⁷ ............................................. B60R 21/34
(52) U.S. Cl. ..................................................... 180/274
(58) Field of Search .................. 180/274, 69.21; 280/730.1; B60R 21/34; B62D 25/10, 25/12

(56) References Cited

U.S. PATENT DOCUMENTS

| | | | | |
|---|---|---|---|---|
| 6,182,782 B1 | * | 2/2001 | Matsuura et al. | ........... 180/274 |
| 6,467,563 B1 | * | 10/2002 | Ryan et al. | ................. 180/274 |
| 6,474,679 B2 | * | 11/2002 | Miyasaka et al. | ........ 280/730.1 |
| 6,497,302 B2 | * | 12/2002 | Ryan | .......................... 180/274 |

FOREIGN PATENT DOCUMENTS

| | | | | |
|---|---|---|---|---|
| JP | 7-125606 | | 5/1995 | |
| JP | 7125608 A | * | 5/1995 | ........... B60R/21/34 |
| JP | 7-125609 | | 5/1995 | |
| JP | 7125610 A | * | 5/1995 | ........... B60R/21/34 |
| JP | 7-246908 | | 9/1995 | |
| JP | 8-11662 | | 1/1996 | |
| JP | 8-72666 | | 3/1996 | |
| JP | 8-183422 | | 7/1996 | |
| JP | 8-183423 | | 7/1996 | |
| JP | 8-230610 | | 9/1996 | |
| JP | 8-258667 | | 10/1996 | |
| JP | 8-276816 | | 10/1996 | |
| JP | 8-276817 | | 10/1996 | |
| JP | 8-324380 | | 12/1996 | |
| JP | 10-315908 | | 12/1998 | |
| JP | 2000-079859 | | 3/2000 | |
| JP | 200389333 A | * | 3/2003 | ........... B60R/21/00 |
| JP | 2003191818 A | * | 7/2003 | ........... B60R/21/34 |
| JP | 2003306101 A | * | 10/2003 | ........... B60R/21/00 |

* cited by examiner

Primary Examiner—Paul N. Dickson
Assistant Examiner—Joselynn Y. Sliteris
(74) Attorney, Agent, or Firm—Finnegan, Henderson, Farabow, Garrett & Dunner, LLP

(57) ABSTRACT

An airbag case that stores an airbag is disposed on a hood inner panel at a location close to an engine compartment. The airbag case is not fixed directly to a hood outer panel. An opening is formed in a portion of the hood outer panel located on a rear side of the airbag case as viewed in the longitudinal direction of the vehicle. In the opening, there is provided a hood garnish panel that turns over rearward upon deployment of the airbag.

12 Claims, 6 Drawing Sheets

HOOD AIRBAG ASSEMBLY

The disclosure of Japanese Patent Application No. 2001-306012 filed on Oct. 2, 2001 including the specification, drawings and abstract is incorporated herein by reference in its entirety.

BACKGROUND OF THE INVENTION

1. Field of Invention

The invention relates to a hood airbag assembly, and more specifically, to a hood airbag assembly including an airbag which is inflated and deployed over a hood of a vehicle such as a motor vehicle.

2. Description of Related Art

A hood airbag device having an airbag which is inflated and deployed over a hood of a vehicle such as a motor vehicle is known.

In the hood airbag device as shown in FIG. 6, an airbag 102 is adapted to be inflated and deployed over a surface of an engine hood 104 by gas generated by an inflator 100. An opening 106 is formed in a predetermined position of the hood 104, and the inflator 100 and the airbag 102 are stored in the space below the opening 106. A backup plate 108 which is open toward the surface of the hood 104 is disposed and provided over the opening 106. A lid 110 which covers the opening end of the backup plate 108 is mounted on the backup plate 108 by folding circumferential portions thereof and engaging it with the edge portion of the opening of the backup plate 108, such that the lid 110 can be deployed to a position shown by the chain double-dashed line.

In the conventional type of the hood airbag device, the backup plate 108, at which the inflator 100 and the airbag 102 are placed, is disposed substantially horizontally. In the aforementioned arrangement, rain water and the like is likely to accumulate around the backup plate 108, deteriorating waterproof performance of the airbag case. The lid 110 is engaged with the end of the backup plate 108 at the opening 106 so as to cover the opening of the backup plate 108 in which the inflator 100 and the airbag 102 are stored. As the lid 110 partially forms a surface of the hood 104, the severe requirement of clearance around the lid 110 may hinder the airbag case from being mounted in a good condition.

SUMMARY OF THE INVENTION

It is an object of the invention to provide a hood airbag device with improved waterproof characteristics and assembly.

In an embodiment of the invention, a hood airbag device includes an airbag case that stores an airbag. The airbag case is mounted within a hood of a vehicle at a location close to an engine compartment of a vehicle. The hood airbag device further includes a door member that is opened upon deployment of the airbag stored in the airbag case. The door member is disposed over an opening formed in the hood on a rear side of the airbag case as viewed in a longitudinal direction of the vehicle.

Because the airbag case storing the airbag is provided at a location close to the engine compartment, rain water and the like is less likely to accumulate in a portion around the airbag case, resulting in improved waterproof characteristics. The door member is provided over the opening formed in the hood on a rear side of the airbag case as viewed in a longitudinal direction of the vehicle. Accordingly the position where the door member is provided is not influenced by an operation for mounting the airbag case in the hood. This makes it possible to position the door member with respect to the hood easily, resulting in easier assembly.

In the embodiment, a plurality of air intake holes are formed in the door member.

Because air holes are formed in the door member, there is no need to form air holes in the cowl box of the vehicle. Accordingly there is an increased degree of freedom in designing the cowl box and peripheral parts.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

A hood airbag device according to an embodiment of the invention will be described referring to FIGS. 1 to 5.

In these figures, an arrow FR represents a forward direction with respect to a longitudinal axis of the vehicle, an arrow UP represents an upward direction with respect to a vertical axis of the vehicle, and an arrow IN represents a direction to the inside of the vehicle with respect to a lateral axis of the vehicle, respectively.

Figure 5:
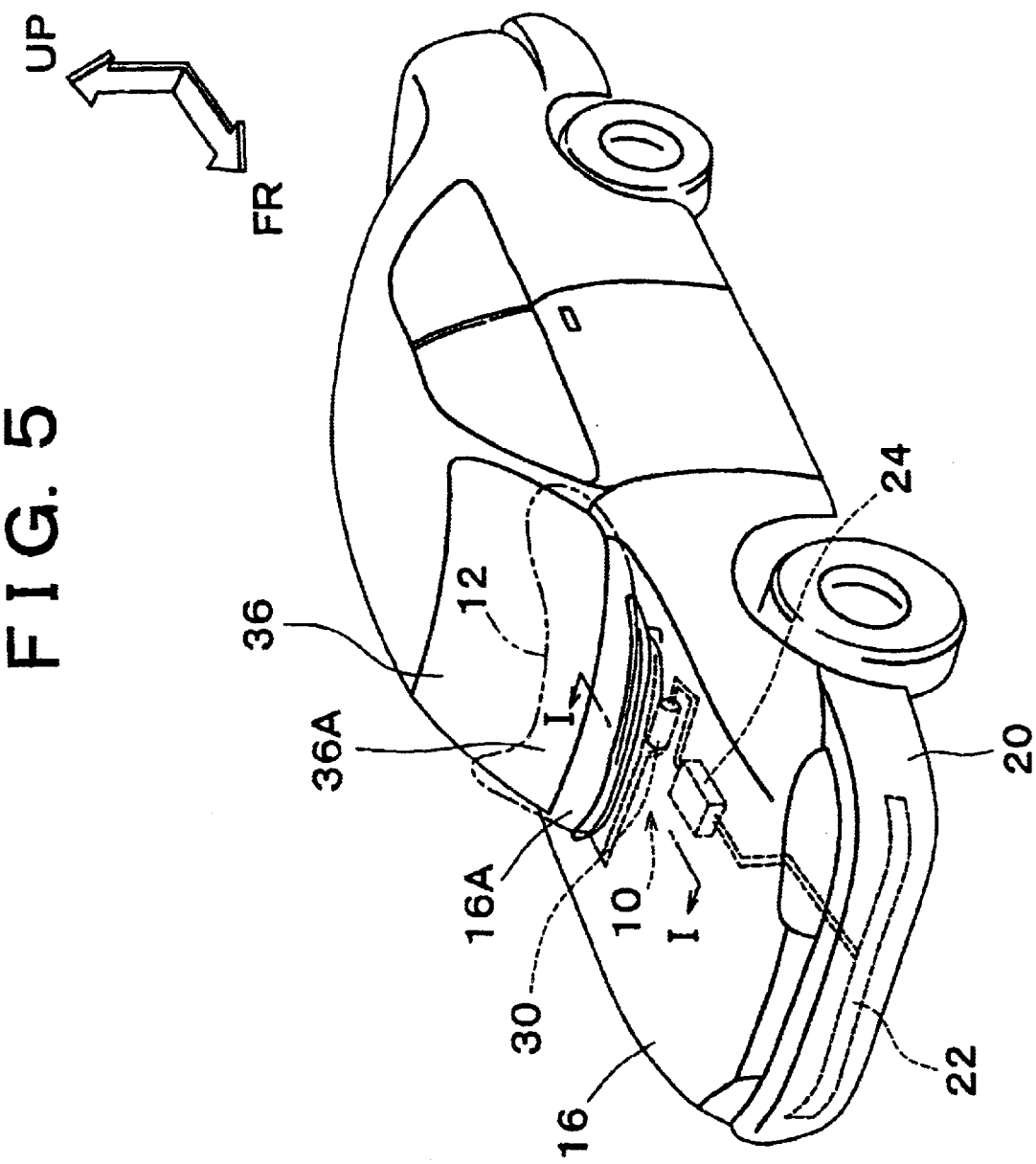
FIG. 5 is a perspective view showing a vehicle in which the hood airbag device according to the embodiment of the invention is used as viewed diagonally from the front of the vehicle.
Figure 6:
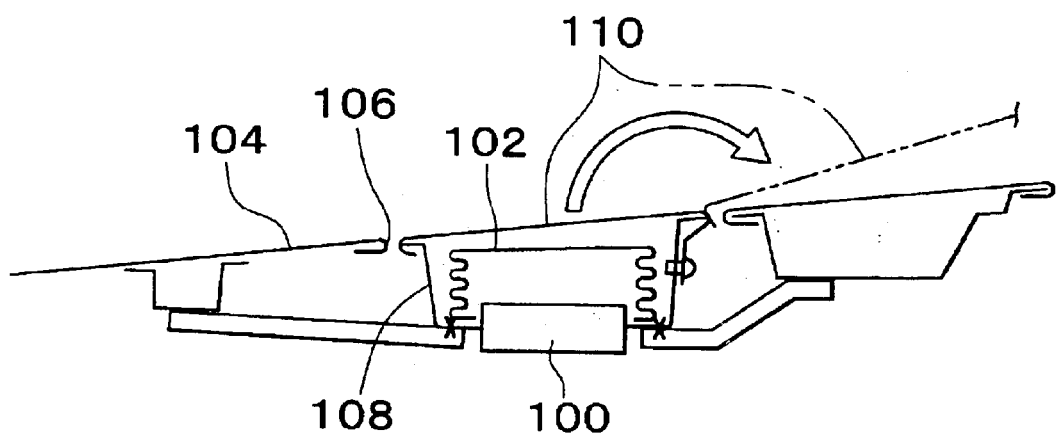
FIG. 6 is a sectional side view showing a conventional hood airbag device.

As shown in FIG. 5, a hood airbag device or a pedestrian protection airbag device 10 of the embodiment includes a sensor 22 disposed within a hood proximate the surface of a front bumper 20. The sensor 22 detects deformation of the front bumper 20 caused when the front bumper 20 abuts on a leg or another body part of a pedestrian. The sensor 22 is connected to a controller 24. The controller 24 is adapted to apply an electric current to the hood airbag device 10 when it is determined that an accident has occurred during running of the vehicle in accordance with a combination of output signals from the sensor 22 and vehicle speed signals. When the electric current is applied to the hood airbag device 10, an inflator 30 is ignited to generate and deliver gas into an airbag 12.

The airbag 12 is arranged to be inflated and deployed over an upper side of a rear end portion 16A of a hood 16 and an upper side of a front end portion 36A of a windshield 36, upon supply of the gas from the inflator 30 to the airbag 12.

Figure 1:
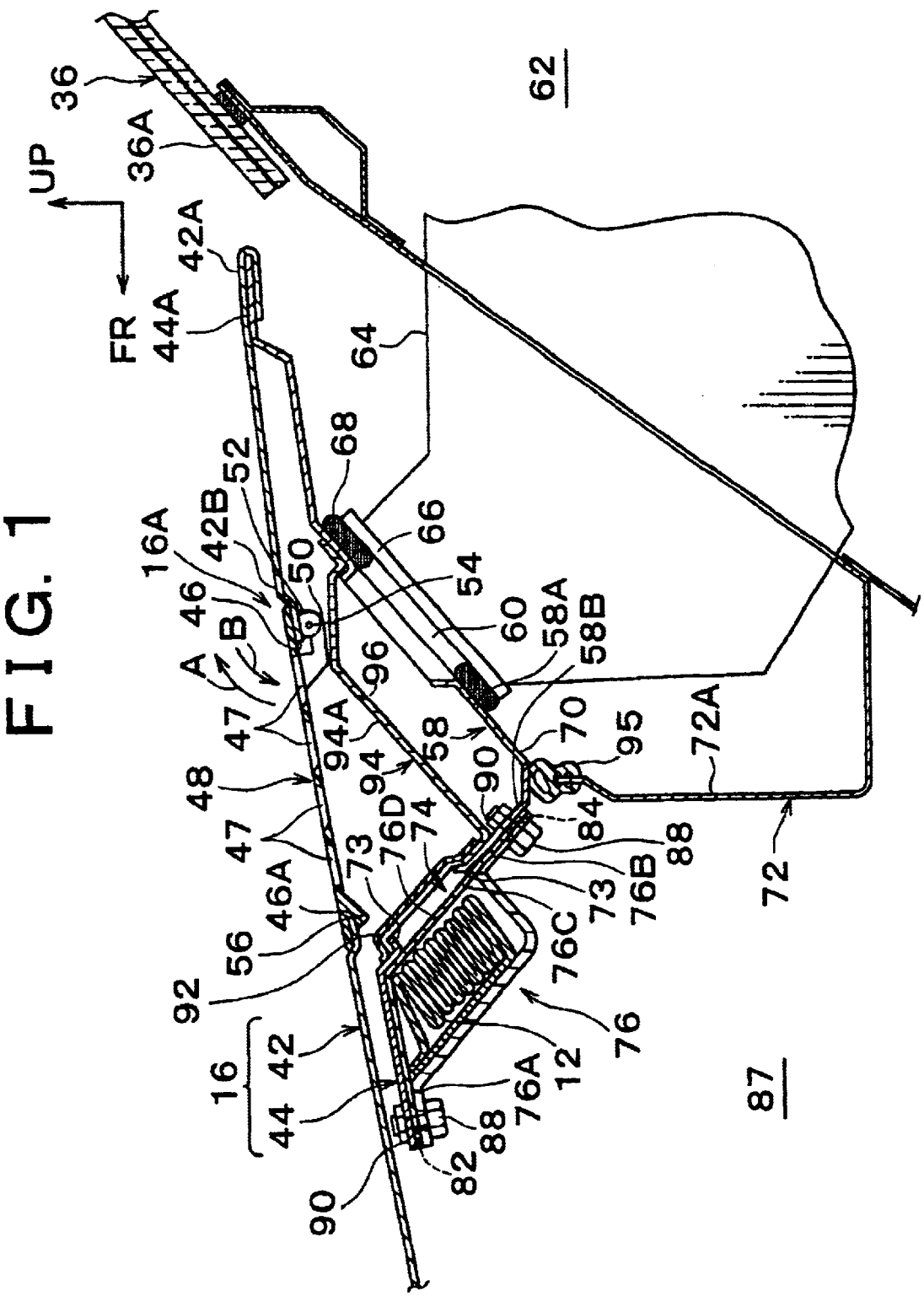
FIG. 1 is an enlarged sectional view taken along line I—I of FIG. 5.

As shown in FIG. 1, the hood 16 includes a hood outer panel 42 and a hood inner panel 44. A rear edge portion 42A of the hood outer panel 42 is hemmed around a rear edge portion 44A of the hood inner panel 44 so as to be fixed.

An opening 46 is formed in an end portion 42B of the hood outer panel 42 along the width of the vehicle. A hood garnish panel 48 as a door member having a plurality of air holes 47 is provided over the opening 46. The hood garnish panel 48 is pivotally supported to a pin 54 of a flange 52 formed in the hood outer panel 42 via a hinge 50 formed in both lateral ends of a rear end portion of the hood garnish panel 48, so as to be pivotable in the vertical direction (direction represented by arrows A and B of FIG. 1). A plurality of claws 56 are formed on the front end of the hood garnish panel 48 along the width of the vehicle so as to be engaged with the front outer peripheral portion 46A of the opening 46.

Figure 2:
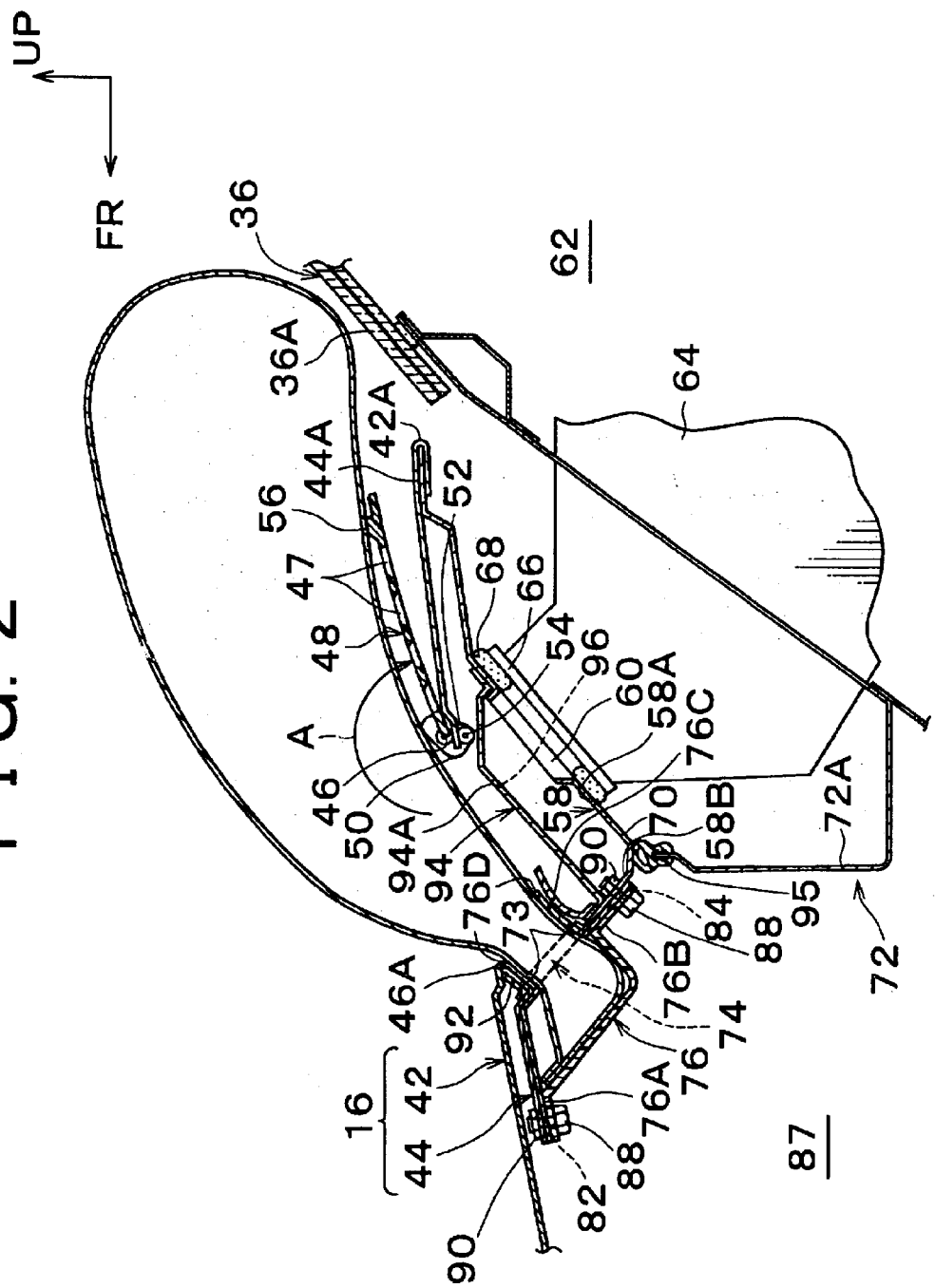
FIG. 2 is a sectional side view showing a hood airbag device according to one embodiment of the invention when an airbag is deployed.

When a load is applied to the hood garnish panel 48 from the lower side of the vehicle, the claws 56 are disengaged from the front outer periphery 46A of the opening 46 and the hood garnish panel 48 is then turned about the pin 54 to the direction represented by the arrow A so as to be moved to an open position at the rear side of the airbag case as shown in FIG. 2.

The hood inner panel 44 below the hood garnish panel 48 has a concave portion 58 that forms a V-shape as a side view. An opening 60 is formed in an upper portion of an inclined surface 58A of the concave portion 58 at the rear side of the airbag case. The opening 60 has a predetermined width along the lateral direction of the vehicle (refer to FIG. 4). An air inlet 66 of an air conditioner 64 for delivering air into a passenger compartment 62 abuts on an outer periphery of the opening 60 via a seal member 68.

The inclined surface 58A has an opening 70 for drainage in its lower portion at a rear side of the concave portion 58.

Further, an opening 74 through which the airbag 12 passes is formed in an inclined surface 58B of the concave portion 58 at its upper portion in the front of the concave portion 58. The opening 74 has a width substantially equal to that of the hood garnish panel 48. An airbag case 76 made of resin is disposed below the opening 74 at a location close to an engine compartment 87.

Figure 3:
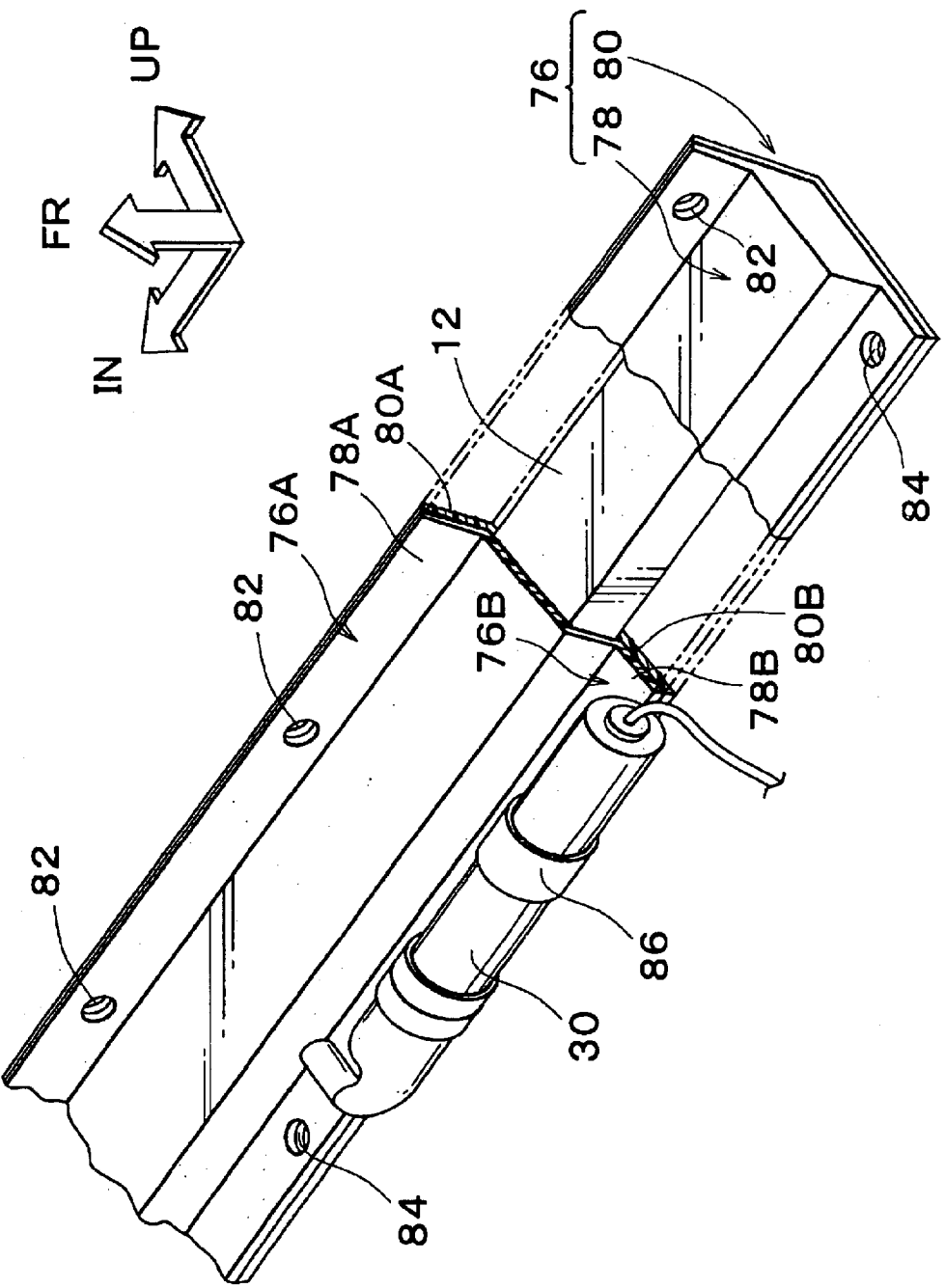
FIG. 3 is a perspective view showing a portion of the hood airbag device according to the embodiment of the invention, viewed diagonally from the lower outside of the vehicle.

As shown in FIG. 3, the airbag case 76 includes a case 78 having a box shape and a flap 80 for closing the opening of the case 78. After the airbag 12 is folded into the airbag case 76, the circumferences of the case 78 and the flap 80 are bonded and sealed using adhesion.

An installation flange 76A of the airbag case 76 includes an installation flange 78A formed at a front edge of the case 78 and an installation flange 80A formed at a front edge of the flap 80. In the installation flange 76A, a plurality of installation holes 82 are formed along the width of the vehicle. Likewise, an installation flange 76B of the airbag case 76 includes an installation flange 78B formed at a rear edge of the case 78 and an installation flange 80B formed at a rear edge of the flap 80. In the installation flange 76B, a plurality of installation holes 84 are formed along the width of the vehicle.

As shown in FIG. 1, a bolt 88 is inserted into each of the installation holes 82, 84 formed in the installation flanges 76A, 76B of the airbag case 76 respectively, from the engine compartment 87. The bolt 88 is then tightened to a weld nut 90 fixed on the upper side of the hood inner panel 44 through an installation hole (not shown) formed in the hood inner panel 44. Thus, the airbag case 76 is attached to the lower side (at the location close to the engine compartment 87) of the hood inner panel 44 using the bolt 88 and the weld nut 90.

As shown in FIG. 3, a conventional inflator 30 is disposed on the installation flange 76B of the airbag case 76 along the lateral direction of the vehicle. The inflator 30 is fixed to the hood inner panel 44 shown in FIG. 1 together with the airbag case 76 using a fixing band 86.

Referring to FIG. 1, a door portion 76C adapted to open at deployment of the airbag is provided in a portion of the airbag case 76 that faces the opening 74 of the hood inner panel 44. A notch having a triangular cross section is formed in an inner surface of the door portion 76C at its center in a perpendicular direction with respect to the door portion 76C. The notch serves as a break portion 76D. A thin resin cover 92 is bonded to the upper portion of the opening 74 so as to cover the flange 73 formed along the circumference of the opening 74. The flange 73 and the cover 92 serve to prevent rain water from entering into the airbag case 76.

As the opening 74 is formed in the inclined surface 58B of the hood inner panel 44, the rain water does not flow into the airbag case 76 from the flange 73 in spite of deterioration in the sealing of the adhered surface between the flange 73 and the cover 92 as the elapse of time.

A hood-to-cowl shield 95 is disposed at an upper edge portion of a front wall 72A of a cowl box 72. The hood-to-cowl shield 95 abuts on a bottom of the concave portion 58 of the hood inner panel 44.

A guide panel 94 is disposed above the inclined surface 58A of the hood inner panel 44 at a location close to the hood garnish panel 48. The guide panel 94 extends from the lower portion of the opening 74 to the upper portion of the opening 60. A guide surface 94A is formed in a portion of the guide panel 94 that faces the hood garnish panel 48 so as to extend from the front-lower side to the rear-upper side of the airbag case substantially in parallel with the inclined surface 58A. The guide surface 94A serves to guide deployment of the airbag.

Figure 4:
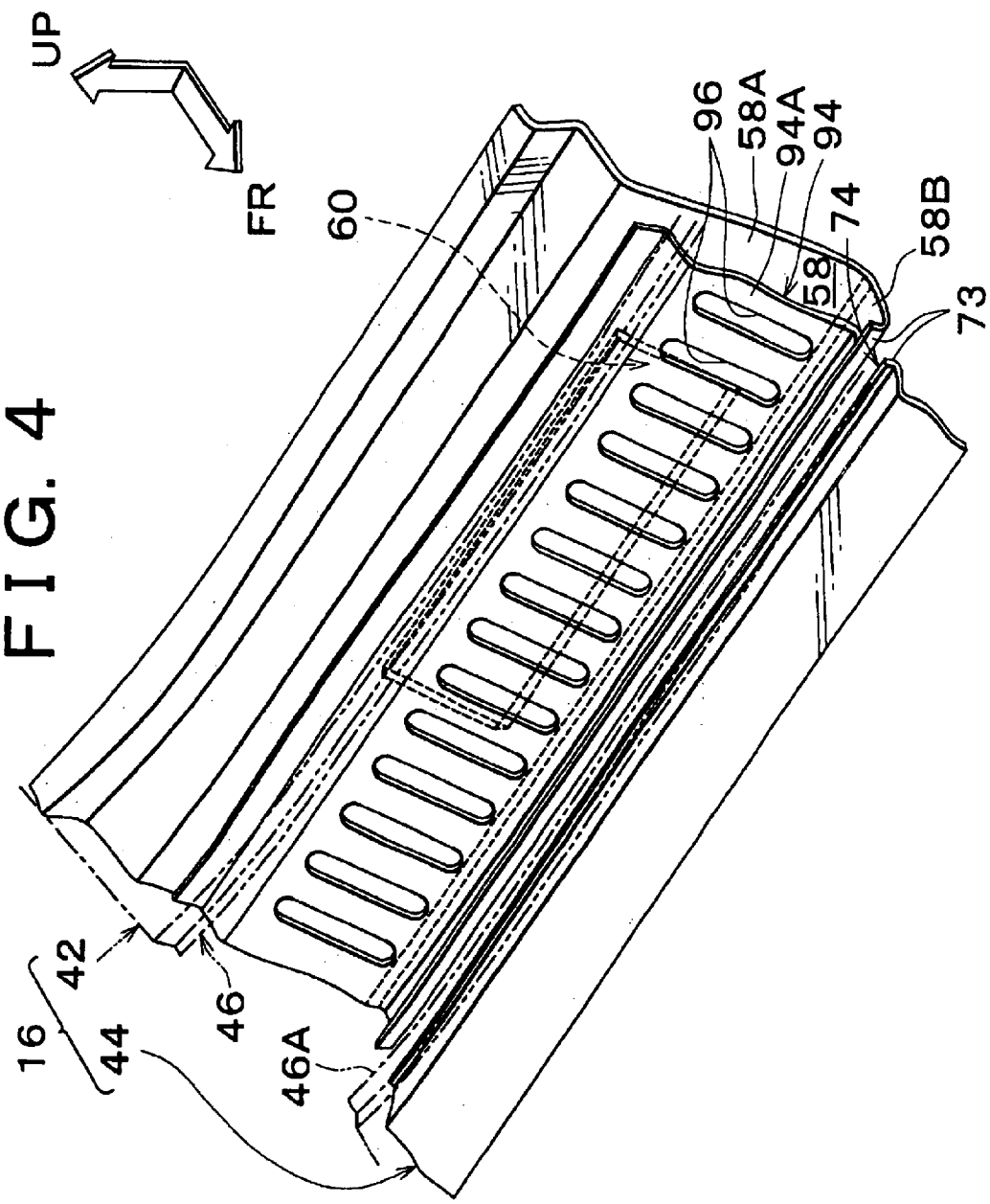
FIG. 4 is a perspective view showing a portion of the hood airbag device according to the embodiment of the invention as viewed diagonally from the front of the vehicle.

As shown in FIG. 4, slits 96 are formed in the guide surface 94A of the guide panel 94 along the width of the vehicle at predetermined intervals so as not to interfere with the flow of air. Air is admitted through a plurality of the air intake holes 47 formed in the hood garnish panel 48 shown in FIG. 1, and is led into the air conditioner 64 through the slits 96 formed in the guide panel 94. Rain water that enters together with air through the air intake holes 47 and the silts 96 is collected in the bottom of the recess 58 of the hood inner panel 44, and then led into the cowl box 72 through the opening 70 (which is indicated in FIG. 1).

In the embodiment, when the sensor 22 detects collision of a pedestrian against the vehicle, the inflator 30 is activated to supply gas into the airbag 12 so as to inflate and deploy the airbag 12. Then, due to the inflation pressure of the airbag 12, the break portion 76D of the airbag case 76 is ruptured to deploy the door portion 76C, and then the cover 92 is ruptured. Subsequently, the airbag 12 bursting from the opening 74 is inflated and deployed along the guide surface 94A of the guide panel 94, thus pressing up the hood garnish panel 48.

The hood garnish panel 48 forced up by the airbag 12 is then turned in the direction represented by the arrow A about the pin 54 to be opened upon disengagement of the claws 56 from the front outer periphery 46A of the opening 46. Referring to FIG. 5, the airbag 12 is inflated and deployed over the rear end portion 16A of the hood 16 and the front end portion 36A of the windshield 36 from the opening 46 formed in the rear end portion 42B of the hood outer panel 42.

As described above, in the embodiment, the airbag case 76 that stores the airbag 12 is provided on a portion of the hood inner panel 44 at the location close to the engine compartment 87. As the airbag case 76 is not directly fixed to the hood outer panel 42, rain water is unlikely to be accumulated in a portion around which the airbag case 76 is disposed, resulting in improved waterproof performance.

In the embodiment, the hood garnish panel 48 which opens at deployment of the airbag is disposed in the hood 16 on a rear side of the airbag case 76 as viewed in the longitudinal direction of the vehicle. The position of the hood garnish panel 48 is not directly influenced by installation of the airbag case 76 to the hood 16. This makes it possible to implement positioning of the hood garnish panel 48 and the hood 16, improving assembling performance. The hood garnish panel 48 can be designed irrespective of structure of the airbag case 76, improving an outer appearance quality of the rear end portion 16A of the hood 16.

In the embodiment, the air intake holes 47 formed in the hood garnish panel 48 may eliminate the need to form air intake holes in the cowl box 72 of the vehicle, improving the degree of design of the cowl box 72 and its peripheral portion.

In the embodiment, the hood garnish panel 48 deploys to the rear of the airbag 12 in the longitudinal direction of the vehicle. This makes it possible to prevent the hood garnish panel 48 from directly hitting the pedestrian or the like.

While the invention has been described in detail with reference to preferred embodiment thereof, it is to be understood that the invention is not limited to the preferred embodiment or construction. It is obvious to those who are skilled in the art that the invention may be embodied in various manners within the scope thereof. For example, the air intake holes 47 for admitting air into the air conditioner 64 are formed in the hood garnish panel 48 in the embodiment. However, the air intake holes 47 are not necessarily formed in the hood garnish panel 48.

In an embodiment of the invention, a hood airbag device includes an airbag case that stores an airbag. The airbag case is mounted within a hood of a vehicle at a location close to an engine compartment of a vehicle. The hood airbag device further includes a door member that is opened upon deployment of the airbag stored in the airbag case. The door member is disposed over an opening formed in the hood on a rear side of the airbag case as viewed in a longitudinal direction of the vehicle. This makes it possible to improve the waterproof performance and assembly performance.

In the embodiment, a plurality of air intake holes are formed in the door member. This arrangement provides an increasing degree of freedom for designing the cowl box and its peripheral portions or members.

What is claimed is:

1. A hood airbag assembly comprising:
   an airbag case storing an airbag, the airbag case having a front side and a rear side and being mounted within a hood of a vehicle at a location proximate an engine compartment of the vehicle; and
   a door member having a surface substantially parallel with the hood that is opened upon deployment of the airbag stored in the airbag case, the door member being disposed over an opening formed in the hood on the rear side of the airbag case as viewed in a longitudinal direction of the vehicle.

2. A hood airbag assembly according to claim 1, wherein an air intake hole is defined in the door member.

3. A hood airbag assembly according to claim 1, wherein the door member comprises a hood garnish panel.

4. A hood airbag assembly according to claim 1, wherein the airbag case is fixed to an inner panel of the hood.

5. A vehicle and hood airbag assembly comprising:
   a vehicle body;
   a vehicle hood having an outer panel and an inner panel attached to the vehicle body covering an engine compartment;
   an airbag case having a front side and a rear side mounted on the hood proximate the engine compartment; and
   a door member provided on the outer panel of the hood openable upon deployment of the airbag, disposed over an opening in the hood on the rear side of the airbag case.

6. The vehicle and hood airbag assembly according to claim 5, wherein the hood includes an inner panel and an outer panel, and the airbag case is mounted on the inner panel.

7. A vehicle and hood airbag assembly according to claim 6, wherein the inner panel of the hood is provided with a hole through which water entering from outside the vehicle body is discharged.

8. A vehicle and hood airbag assembly according to claim 6, wherein the inner panel has an inclined face, and an opening is formed in a lower portion of the inclined face.

9. A vehicle and hood airbag assembly according to claim 5, wherein the door member comprises a hood garnish panel.

10. A vehicle and hood airbag assembly according to claim 5, wherein an air intake hole is defined in the door member.

11. A hood airbag assembly comprising:
    an airbag case storing an airbag, the airbag case having a front side and a rear side and being mounted within a hood of a vehicle at a location proximate an engine compartment of the vehicle, the hood having an outer panel and an inner panel; and
    a door member provided on the outer panel of the hood that is opened upon deployment of the airbag stored in the airbag case, the door member being disposed over an opening formed in the hood on the rear side of the airbag case as viewed in a longitudinal direction of the vehicle.

12. A vehicle and hood airbag assembly comprising:
    a vehicle body;
    a vehicle hood attached to the vehicle body covering an engine compartment;
    an airbag case having a front side and a rear side mounted on the hood proximate the engine compartment; and
    a door member having a surface substantially parallel with the hood openable upon deployment of the airbag, disposed over an opening, in the hood on the rear side of the airbag case.

* * * * *

UNITED STATES PATENT AND TRADEMARK OFFICE
CERTIFICATE OF CORRECTION

PATENT NO. : 6,827,170 B2
DATED : December 7, 2004
INVENTOR(S) : Makoto Hamada et al.

It is certified that error appears in the above-identified patent and that said Letters Patent is hereby corrected as shown below:

Column 6,
Line 57, "opening, in" should read -- opening in --.

Signed and Sealed this

Twenty-ninth Day of March, 2005

JON W. DUDAS
*Director of the United States Patent and Trademark Office*